United States Patent
Bucher et al.

(10) Patent No.: US 10,199,833 B1
(45) Date of Patent: Feb. 5, 2019

(54) POWER BALANCING

(71) Applicant: Seagate Technology LLC, Cupertino, CA (US)

(72) Inventors: James Bucher, Montgomery, MN (US); Dale Erickson, Edina, MN (US)

(73) Assignee: Seagate Technology LLC, Cupertino ( * ) Notice: Subject to any disclaimer, the term of this patent is extended or adjusted under 35 U.S.C. 154(b) by 368 days.

(21) Appl. No.: 15/061,925

(22) Filed: Mar. 4, 2016

(51) Int. Cl.
    H02J 4/00 (2006.01)

(52) U.S. Cl.
    CPC .................................... H02J 4/00 (2013.01)

(58) Field of Classification Search
    CPC ....................................................... H02J 4/00
    USPC ................... 307/24, 29, 23, 60, 19
    See application file for complete search history.

(56) References Cited

U.S. PATENT DOCUMENTS

| | | | |
|---|---|---|---|
| 5,181,169 A | 1/1993 | Murugan | |
| 5,998,885 A | 12/1999 | Tamor et al. | |
| 6,320,358 B2 | 11/2001 | Miller | |
| 6,344,985 B1 | 2/2002 | Akerson | |
| 6,496,393 B1 | 12/2002 | Patwardhan | |
| 6,885,173 B2 | 4/2005 | Lee | |
| 7,012,822 B2 | 3/2006 | Zhu et al. | |
| 7,936,083 B2 | 5/2011 | Stancu et al. | |
| 9,088,175 B2 | 7/2015 | Fang | |
| 9,240,742 B1 | 1/2016 | Erickson et al. | |
| 2004/0189094 A1* | 9/2004 | Hori ........................ | H02J 9/062 307/29 |
| 2005/0135124 A1 | 6/2005 | Mora et al. | |
| 2010/0001585 A1* | 1/2010 | Nagata ..................... | H02J 3/14 307/24 |
| 2012/0262133 A1 | 10/2012 | Martinelli | |

OTHER PUBLICATIONS

Zhang, Bidirectional DC-DC Power Converter Design Optimization, Modeling and Control, Jan. 30, 2008, Blacksburg, VA, 149 pages. http://scholar.lib.vt.edu/theses/available/etd-02052008-122048/unrestricted/Dissertation_jhz.pdf.
Karshenas et al., Bidirectional DC-DC Converters for Energy Storage Systems, pp. 161-179, 2011, Department of Elec. & Computer Eng., Queen's University, Kingston. http://cdn.intechopen.com/pdfs-wm/20368.pdf.
Cultura II et al., Design and Analysis of a 24 Vdc to 48 Vdc Bidirectional DC-DC Converter Specifically for a Distributed Energy Application, 2012, pp. 315-323. www.scirp.org/journal/PaperDownload.aspx?paperID=22836.

* cited by examiner

*Primary Examiner* — Thomas Skibinski
(74) *Attorney, Agent, or Firm* — Cesari & Reed, LLP; Kirk A. Cesari; Christian W. Best

(57) ABSTRACT

Electronic devices may have several power supplies. Current from the power supplies may be provided to multiple loads, such as motors, processors, or other devices. When a current demand of one or more of the loads increases, current from the power supplies may be provided to meet the increased current demands of the one or more loads. To determine how much current can be provided to the loads from the power supplies, output currents of the power supplies can be determined, and a feedback voltage can be generated based on the output currents. The feedback voltage can be compared against hysteretic voltages to determine how much current may be transferred from the power supplies to the loads to compensate for the current demands of the loads.

20 Claims, 5 Drawing Sheets

POWER BALANCING

SUMMARY

In some embodiments, an apparatus can include a first current sense circuit configured to produce a first sense signal based on current received from a first power source and a second current sense circuit configured to produce a second sense signal based on current received from a second power source. Further, an apparatus can include a bi-directional converter circuit configured to provide an amount of current based on the first sense signal and the second sense signal from the second power source to a first load coupled to the first power source to compensate for a current demand of the first load that cannot be met by the first power source.

In some embodiments, a system can include a first control circuit configured to provide a first control signal to a first input of a bi-directional converter circuit based on current supplied by a first power source coupled to a first input/output ("I/O") node of the bi-directional converter circuit and a second control circuit configured to provide a second control signal to a second input of the bi-directional converter circuit based on current supplied by a second power source coupled to a second I/O node of the bi-directional converter circuit. Further, a system can include the bi-directional converter circuit configured to transfer an amount of current from the second power source to a first load coupled to the first I/O node based on a first feedback signal representing an amount of power provided from the second power source to the first load to compensate for a current demand of the first load that cannot be supplied by the first power source.

In some embodiments, a system can include a first current sense circuit configured to produce a first sense signal based on current received from a first power source, a second current sense circuit configured to produce a second sense signal based on current received from a second power source, and a voltage source configured to produce a hysteretic voltage representing a regulation threshold corresponding to a regulation of current from the second power source. The system may further include a bi-directional converter circuit configured to provide an amount of current based on the first sense signal, the second sense signal, and the hysteretic voltage, from the second power source to a first load coupled to the first power source to compensate for a current demand of the first load that cannot be met by the first power source.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a hard disc drive. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a memory device, including instructions that when executed cause a processor to perform the methods.

Figure 1:
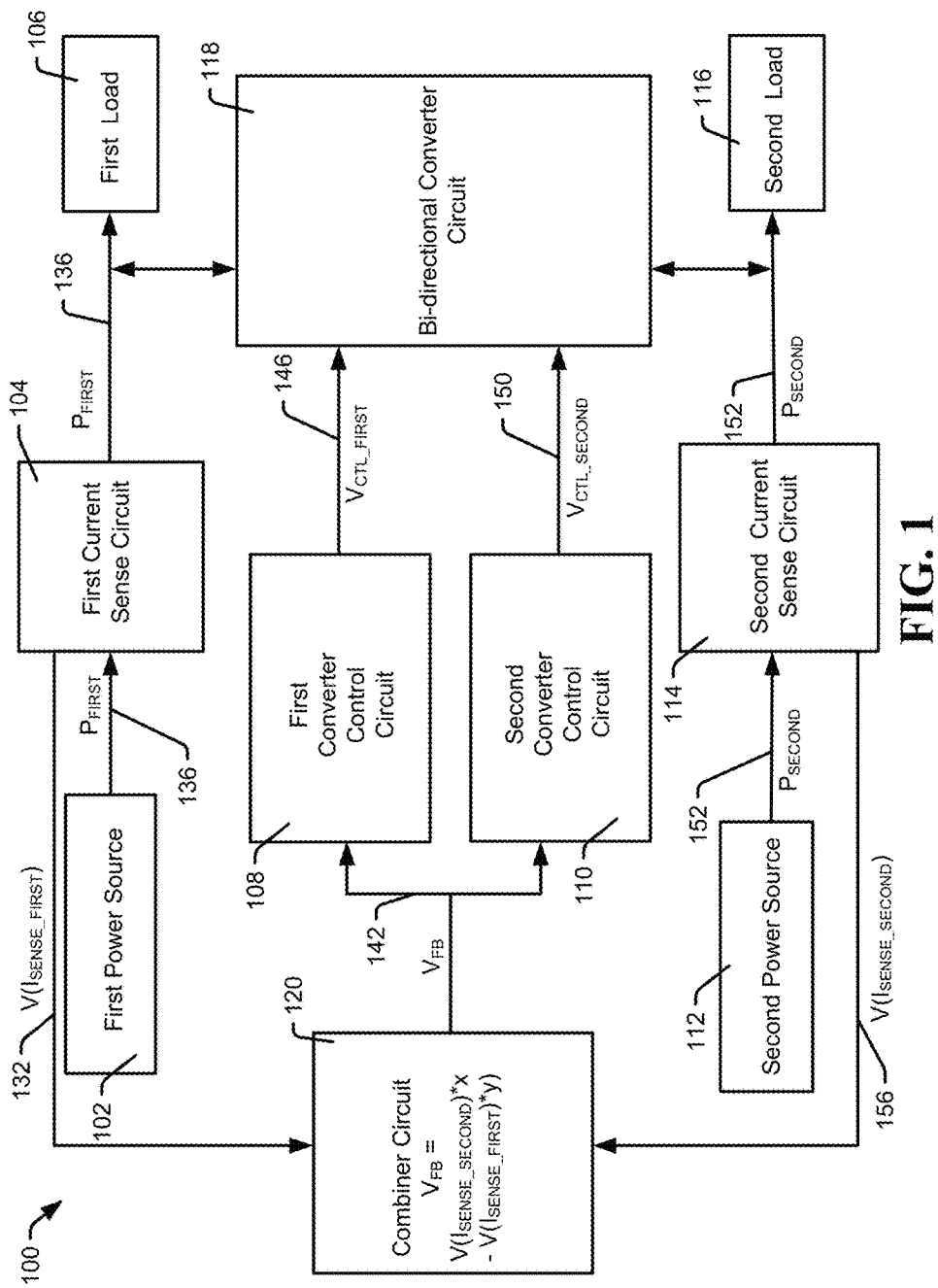
FIG. 1 is a functional block diagram of a system of power balancing, in accordance with certain embodiments of the present disclosure.

Referring to FIG. 1, a block diagram of a system of power balancing is shown and generally designated 100. The system 100 can include a first power source 102 and a second power source 112. The first power source 102 and the second power source 112 may include batteries, power converter circuits, transformers, rectifier circuits, voltage regulator circuits, solar circuits, other power sources, or any combination thereof. The first power source 102 can have an output to supply a first power signal, $P_{FIRST}$ 136, to an input of a first current sense circuit 104. The second power source 112 can have an output to supply a second power signal, $P_{SECOND}$ 152, to an input of a second current sense circuit 114. In some embodiments, $P_{FIRST}$ 136 and $P_{SECOND}$ 152 may have the same voltage amplitude. For example, $P_{FIRST}$ 136 and $P_{SECOND}$ 152 may both have a voltage amplitude of 12 volts. However, in some embodiments, $P_{FIRST}$ 136 and $P_{SECOND}$ 152 may have different voltage amplitudes. For example, $P_{FIRST}$ 136 may have a voltage amplitude of 12 volts while $P_{SECOND}$ 152 may have a voltage amplitude of 5 volts.

The first current sense circuit 104 may have an output to provide $P_{FIRST}$ 136 to an input of a first load 106 and an input of a bi-directional converter circuit 118. The second current sense circuit 114 can have an output to provide $P_{SECOND}$ 152 to an input of a second load 116 and an input of the bi-directional converter circuit 118. The first load 106 and second load 116 may include one or more of electronic circuits, inverter circuits, electric motors, power supplies, compressors, automotive devices, household devices, industrial devices, medical devices, resistive devices, heating or cooling devices, lighting circuits, other devices, or any combination thereof. The first load 106 and the second load 116 may draw current at the same time, and an amount of current the second load 116 and the first load 106 draw may vary independently. For example, the first load 106 may be an electric motor in a data storage device (such as the data storage device 501 shown in FIG. 5), and the second load 116 may be a processor or controller in a data storage device (such as the data storage device 501 shown in FIG. 5). An electric motor may consume more power when it spins up (e.g. when a rotational velocity of the motor's shaft increases) than when the motor's shaft is at a constant rotational velocity, while a processor or controller may consume more current when larger quantities of data are processed than when less data are processed. Since the increase in the motor's rotational velocity may be independent of the data processing of the controller, the current demand of the first load 106 may not be related to a change in the current demand of the second load 116.

The first current sense circuit 104 may produce a first sense signal, $V(I_{SENSE\_FIRST})$ 132, and have an output to provide the first sense signal 132 to an input of a combiner circuit 120. The second current sense circuit 114 may produce a second sense signal, $V(I_{SENSE\_SECOND})$ 156, and have an output to provide the second sense signal 156 to an input of the combiner circuit 120. $V(I_{SENSE\_FIRST})$ 132 and $V(I_{SENSE\_SECOND})$ 156 may be voltage signal representations of current from the first power source 102 and the second power source 112, respectively. The first current sense circuit 104 and the second current sense circuit 114 may be current controlled voltage sources, current sensing field-effect transistors (FETs), sense amplifiers, isolation amplifiers, other circuits, current probes, or any combination thereof. In some examples, a current sensing FETs (sense FET) may be a power metal-oxide-semiconductor FET (MOSFET) that is constructed to route a portion of the current flowing between a drain and source terminal of a main transistor to a drain or source of a sense transistor. The ratio of current flowing through the main transistor compared to the current flowing through sense transistor may be 500:1. The current flowing through the sense transistor may also flow through a resistor. When the current flows through the resistor, a voltage signal (e.g. $V(I_{SENSE\_FIRST})$ 132) proportional to the current may result.

The combiner circuit 120 may be a circuit that can produce a feedback signal, $V_{FB}$ 142, based on $V(I_{SENSE\_FIRST})$ 132 and $V(I_{SENSE\_SECOND})$ 156. The combiner circuit 120 may be a summing circuit, such as an operational amplifier configured to combine two or more signals. In some embodiments, the combiner circuit 120 may be one or more data converters coupled to a processor. For example, a data converter can convert $V(I_{SENSE\_FIRST})$ 132 and $V(I_{SENSE\_SECOND})$ 156 into digital signals. The processor may receive the digital signals and perform a mathematical operation(s) on the digital signals to produce a digital feedback voltage. A data converter can convert the digital feedback voltage into $V_{FB}$ 142.

The combiner circuit 120 may have an output to provide $V_{FB}$ 142 to an input of a first converter control circuit 108 and an input of a second converter control circuit 110. The first converter control circuit 108 can produce a first control signal, $V_{CTL\_FIRST}$ 146, based on $V_{FB}$, and can have an output to provide $V_{CTL\_FIRST}$ 146 to an input of a bi-directional switching circuit 118. The second converter control circuit 110 can produce a second control signal, $V_{CTL\_SECOND}$ 150, based on $V_{FB}$, and can have an output to provide $V_{CTL\_SECOND}$ 150 to an input of a bi-directional switching circuit 118.

The bi-directional converter circuit 118 can include switching circuits, such as relays, transistors (e.g. bipolar junction transistors ("BJTs"), field effect transistors ("FETs"), etc.), other switching devices, or any combination thereof. Switching circuits in the bi-directional converter circuit 118 can be configured to form a low impedance current path between the first load 106 and the second load 116 to transfer a portion of $P_{FIRST}$ 136 to $P_{SECOND}$ 152 to compensate for a power demand of the second load 116. The bi-directional converter circuit 118 can also transfer a portion of $P_{SECOND}$ 152 to $P_{FIRST}$ 136 to compensate for a power demand of the first load 106.

During operation, the first load 106 and the second load 116 may draw current from the first power source 102 and the second power source 112, respectively. The first current sense circuit 104 can sense an amplitude of a current corresponding to $P_{FIRST}$ 136 that is being supplied by the first power source 102. The first current sense circuit 104 can produce the sense signal $V(I_{SENSE\_FIRST})$ 132 based on an amplitude of the current, and provide $V(I_{SENSE\_FIRST})$ 132 to the combiner circuit 120. Similarly, the second current sense circuit 114 can sense an amplitude of a current corresponding to $P_{SECOND}$ 152. The second current sense circuit 114 can produce the sense signal $V(I_{SENSE\_SECOND})$ 156 based on the amplitude of the current, and provide the sense signal $V(I_{SENSE\_SECOND})$ 156 to the combiner circuit 120.

The first current sense circuit 104 and second current sense circuit 114 may continuously update $V(I_{SENSE\_FIRST})$ 132 and $V(I_{SENSE\_SECOND})$ 156, respectively. However, the first current sense circuit 104 and the second current sense circuit 114 may update their respective sense signals periodically, at intervals, upon detection of a trigger, or for other reasons. For example, the first current sense circuit 104 may detect a trigger from the first load 106 to start providing $V(I_{SENSE\_FIRST})$ 132 when the current demands of the first load 106 change. In some cases, a processor or other circuit may provide the current sense circuit 104 with an indicator to start providing $V(I_{SENSE\_FIRST})$ 132. In some examples, $V_{(ISENSE\_FIRST)}$ 132, $V_{(ISENSE\_SECOND)}$ 156, or both, may represent an average value of an amplitude of their respective currents. For example, $V_{(ISENSE\_FIRST)}$ 132 can represent an amplitude of current corresponding to $P_{FIRST}$ 136 averaged over a period of time.

The combiner circuit 120 can combine $V(I_{SENSE\_FIRST})$ 132 and $V(I_{SENSE\_SECOND})$ 156 to produce the feedback voltage, $V_{FB}$ 142. In some embodiments, $V_{FB}$ 142 may be equal to $V(I_{SENSE\_Second})*X - V(I_{SENSE\_FIRST})*Y$. "X" and "Y" may be values selected to allow $P_{FIRST}$ and $P_{SECOND}$ to deliver a desired amount power. For example, "X" and "Y" may be selected to allow an amount of power that can be delivered by both $P_{FIRST}$ 136 and $P_{SECOND}$ 152 to be 5 watts. In some cases, "X" and "Y" may correspond to a voltage of the second power source 112 and the first power source 102, respectively.

The combiner circuit 120 can provide $V_{FB}$ 142 to the first converter control circuit 108. The first converter control circuit 108 can compare $V_{FB}$ 142 to a reference voltage. The reference voltage may represent a regulation threshold corresponding to a regulation of current from the first power source 102. The reference voltage may be a hysteretic voltage, which may include a dc offset voltage and a triangle waveform signal. In some embodiments, the triangle waveform signal may be of fixed amplitude and frequency. When $V_{FB}$ 142 is greater than the hysteretic voltage, the second load 116 may be demanding more current than the first load 106. An amount of a voltage difference between $V_{FB}$ 142 and the hysteretic voltage may determine how much current can be provided to the second load 116 from $P_{FIRST}$ 136 to compensate for the current demand of the second load 116. For example, more current may be provided when $V_{FB}$ 142 is 40 millivolts ("mV") higher than the hysteretic voltage as compared to when $V_{FB}$ 142 is 20 mV higher than the hysteretic voltage.

The first converter control circuit 108 can compensate for the current demand of the second load 116 by providing $V_{CTL\_FIRST}$ 146 to the bi-directional converter circuit 118. The bi-directional converter circuit 118 can transfer a portion of $P_{FIRST}$ 136 to $P_{SECOND}$ 152 in response to an amplitude of $V_{CTL\_FIRST}$ 146. For example, when $V_{CTL\_FIRST}$ 146 is above a threshold level, a switching device (e.g. transistor, relay, etc.) can create a low impedance current path, which may allow current corresponding to $P_{FIRST}$ 136 to flow to the second load 116. In some systems, hysteretic voltage based feedback may be preferred to amplifier based feedback because hysteretic voltage may have only passive and reactive components in its control loop, which may provide more stability than feedback based on active circuits. For example, an inverting amplifier may be used for feedback so that the gain can be rolled off below unity at the switching frequency of the hysteretic voltage. In some systems, to be stable, a minimum gain margin (e.g. at least 10 dB) and a minimum phase margin (e.g. at least 20 degrees) may be required. A reactive corner (e.g. corner frequency of an inductor-capacitor circuit) can produce 180 degrees of phase shift, a passive corner (e.g. corner frequency of a resistor-capacitor circuit) can produce 90 degrees of phase shift, the inverting amplifier can produce 180 degrees of phase shift, and a pole can introduce an additional 90 degrees of phase shift. The gain can be rolled off (e.g. a decade) below the switching frequency of the hysteretic voltage (e.g. to provide 20 dB of gain margin) to improve stability. The low gain can impact transient response. There may be methods that will allow gain at the switching frequency of the hysteretic voltage, such as phase boost (e.g. a zero pole pair is placed in a transfer function to reduce phase lag) or hysteretic voltage based feedback since it can provide at least 90 degrees of phase margin and a fast transient response.

The combiner circuit 120 can also provide $V_{FB}$ 142 to the second converter control circuit 110, which can compare $V_{FB}$ 142 to a reference voltage. The reference voltage of the second converter control circuit 110 may represent a regulation threshold corresponding to a regulation of current from the second power source 212, and may be a hysteretic voltage. The hysteretic voltage of the second converter control circuit 110 may be different than the hysteretic voltage of the first converter control circuit 108. When $V_{FB}$ 142 is less than the hysteretic voltage, the first load 106 may be demanding more current than the second load 116. To compensate for the power demand of the first load 106, the second converter control circuit 110 can provide $V_{CTL\_SECOND}$ 150 to the bi-directional converter circuit 118, which can provide a portion of $P_{SECOND}$ 152 to the first load 106 based on an amplitude of $V_{CTL\_SECOND}$ 150. For example, when $V_{CTL\_SECOND}$ 150 is above a threshold level, a switching circuit, such as a solid state switch, can be closed to create a low impedance current path between the second current sense circuit 114 and the first load 106, thus allowing a portion of $P_{SECOND}$ 152 to be provided to the first load 106.

When the power delivered by $P_{FIRST}$ 136 and $P_{SECOND}$ 152 are close in value (e.g. within a pre-determined window), the first converter control circuit 108 and the second converter control circuit 110 may not transfer any current between $P_{FIRST}$ 136 and $P_{SECOND}$ 152. For example, when $P_{FIRST}$ 136 and $P_{SECOND}$ 152 are close in value, $V_{FB}$ 142 may not be high enough to cause the first converter control circuit 108 to trigger the bi-directional converter circuit to provide a portion of $P_{FIRST}$ 136 to $P_{SECOND}$ 152, or low enough to cause the second converter control circuit 110 to trigger the bi-directional converter circuit 118 to provide a portion of $P_{SECOND}$ 152 to $P_{FIRST}$ 136. In this way, appropriate amounts of current may be transferred as needed to compensate for loading conditions of the first load 106 and the second load 116, which can cause a total amount of power delivered by $P_{FIRST}$ 136 and $P_{SECOND}$ 152 to be similar (balanced) across changing load conditions. For example, when a power demand of the first load 106 is 1 watt and a power demand of the second load 116 is 4 watts, a responsibility to meet the total power demand of 5 watts may be divided between $P_{FIRST}$ 136 and $P_{SECOND}$ 152. When $P_{FIRST}$ 136 and $P_{SECOND}$ 152 may both deliver up to 3 watts of power, all 3 watts of power from $P_{SECOND}$ 152 may be delivered to the second load 116. Of the 3 watts of power that can be delivered by $P_{FIRST}$ 136, 1 watt may be delivered to the first load 106, which may leave 2 watts available for transfer to $P_{SECOND}$ 152. A 1 watt portion of $P_{FIRST}$ 136 can be provided to the second load 116 to meet the 4 watt power demand of the second load 116. The remaining 1 watt of unused power of $P_{FIRST}$ 136 may be available to meet further increases in the power demands of the first load 106 or the second load 116.

The system 100 can be implemented in a data storage device (such as the data storage device 501 shown in FIG. 5) to balance power between different supply rails. For example, the system 100 can be implemented in the data storage device 501 to provide current from the second power supply 530 to the controller 506 when the controller 506 processes large amounts data.

Figure 2:
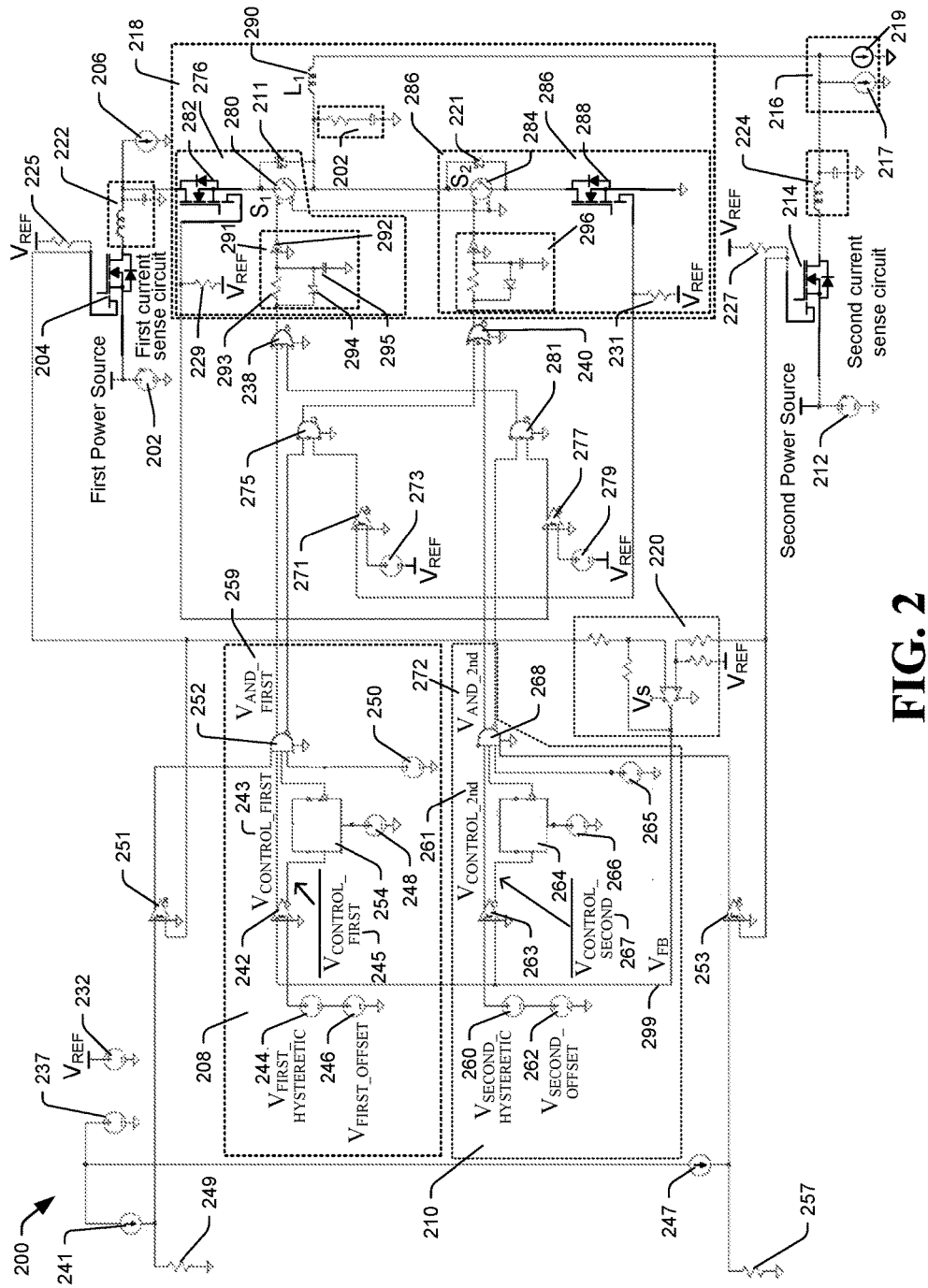
FIG. 2 is diagram of a system of power balancing, in accordance with certain embodiments of the present disclosure.

Referring to FIG. 2, a diagram of a system of power balancing is shown and generally designated 200. The system 200 may be an example implementation of the system 100, according to certain embodiments. The system 200 can include a first power source 202 and a second power source 212. The first power source 202 may be coupled to a first current sense circuit 204. The first current sense circuit 204 may be coupled to a first load circuit 206 and a bi-directional converter circuit 218. The bi-directional converter circuit 218 may be coupled to a second load circuit 216 and a second current sense circuit 214. The second current sense circuit 214 may be coupled to the second power source 212. The system 200 can further include a first filter circuit 222 coupled to the first current sense circuit 204 and the bi-directional converter circuit 218, and a second filter circuit 224 coupled to the second current sense circuit 214 and the bi-directional converter circuit 218. The first filter circuit 222 and the second filter circuit 224 may be low pass filters, such as inductor-capacitor filters.

The first current sense circuit 204 may include circuits to sense a current flowing from an output of the first power source 202 to an input of the first filter circuit 222. The first current sense circuit 204 may include sense FETs, resistors, operational amplifiers, other circuits, or any combination thereof. The first current sense circuit 204 can produce a current based on the current flowing from the output of the first power source 202 to an input of the first filter circuit 222. The current can flow through a resistor 225 to produce a voltage signal. The voltage signal may be provided to a combiner circuit 220 and an inverting input node of a comparison circuit 251. A comparison circuit can include a comparator, amplifier, or other device that can be configured to produce an output signal above or below a threshold based on voltage signals at its inputs. The second current sense circuit 214 may be similar to the first current sense circuit 204. The second current sense circuit 214 may include circuits to sense a current flowing from an output of the second power source 212 to an input of the second filter circuit 224. The second current sense circuit 214 can produce a current based on the current flowing from the output of the second power source 212 to the input of the second filter circuit 224. The current can flow through a resistor 227 to produce a voltage signal, which may be provided to the combiner circuit 220 and an inverting input node of a comparison circuit 253.

Coupled to the first current sense circuit 204 and the second current sense circuit 214, the bi-directional converter circuit 218 may include a first bi-directional converter switching circuit 276 coupled to a second bi-directional converter switching circuit 286. The first bi-directional switching circuit 276 may include a current sensing circuit 282. The current sensing circuit 282 may be a combination of switch $S_1$ 280 and diode 211. However, in some examples, the current sensing circuit 282, diode 211, and $S_1$ 280 may be separate components. $S_1$ 280 may be a relay, bipolar transistor, FET, or other device that can be configured to provide a low-impedance current path when a control signal is applied or removed. For example, $S_1$ 280 may be a p-channel metal oxide FET. The current sensing circuit 282 may be a sense FET or other current sensing circuit. The gate nodes of the current sensing circuit 282, the current sensing circuit 288, the first current sense circuit 208, and the second current sense circuit 214, may be coupled to a power source, a driver circuit such as switch driver circuit 291, or other circuit. In some examples, $S_1$ 280 may include the current sensing circuit 282. The first bi-directional converter switching circuit 276 may include other circuits or components, such as the switch driver circuit 291, resistor 229, diodes, short circuit protection circuits, other circuits, or any combination thereof. In some embodiments, the switch driver circuit 291 may include a diode 294 and a circuit 292. The circuit 292 may be an amplifier (e.g. operational amplifier), bipolar transistor, FET, comparator, other circuit, or any combination thereof. The switch driver circuit 291 may also include and a resistor 293 and capacitor 295 configured to delay how quickly $S_1$ 280 can create a high impedance current path or a low impedance current path in response to changes in the control signal.

Similar to the first bi-directional switching circuit 276, a second bi-directional switching circuit 286 can include a current sensing circuit 288, switch driver circuit 296, resistor 231, and other circuits. The current sensing circuit 288 may be a combination of switch $S_2$ 284 and diode 221. However, the current sensing circuit 288, $S_2$ 284, and diode 221 may be separate components. In some examples, $S_2$ 284 may be an n-channel metal oxide FET. The current sensing circuit 288 may be a sense FET or other circuit.

The first bi-directional switching circuit 276 and the second bi-directional switching circuit 286 may be coupled to an inductor ("$L_1$") 290. $L_1$ 290 may also be coupled to the second load circuit 216 and the second filter circuit 224. A value of $L_1$ 290 may be selected to optimize (e.g. increase efficiency, reduce ripple current, improve transient response time, etc.) operation of the bi-directional converter circuit 218. In some embodiments, $L_1$ 290 may be selected for its physical characteristics (e.g. height, width, length, etc.), electrical characteristics (e.g. inductance, impedance, etc.), or both. The second load circuit 216 may include multiple load circuits, such as load A 219 and load B 217. Load A 219 and the load B 217 may be processors, motors, multimedia devices, charging devices, or other devices that draw power at a voltage supplied by the second power source 212.

The bi-directional converter circuit 218 may be coupled to a logical OR circuit 238 and a logical OR circuit 240. The logical OR circuit 238 and the logical OR circuit 240 may be coupled to a first converter control circuit 208 and a second converter control circuit 210, respectively. The first converter control circuit 208 can include a comparison circuit 242 which may be coupled to the combiner circuit 220. The comparison circuit 242 may have an input to receive voltage signals from one or more voltage sources. For example, the comparison circuit 242 may receive voltage signals from a first hysteretic voltage source 244 and a first direct current ("dc") offset voltage source 246. In some cases, dc offset voltage source 246 may be a programmable voltage source, such as a programmable digital to analog converter, which can produce a first programmable offset voltage. The comparison circuit 242 can include a non-inverted output to supply a first control signal, $V_{CONTROL\_FIRST}$, 243, to an input of a logical AND circuit 252. The comparison circuit 242 may also include an inverted output to supply an inverted (opposite) version of the first control signal, $V_{CONTROL\_FIRST}'$, 245, to an input of a latch circuit 254. The latch circuit 254 may be a set-reset ("SR") latch, JK flip flop, or other circuit. For example, the latch circuit 254 may be a D (data or delay) flip-flop. An output of a D flip flop may be based on a signal at a clock input ("CLK"), a signal at a clear input ("CLR"), or other signals at other inputs. The latch circuit 254 may receive $V_{CONTROL\_FIRST}'$ 245 at the CLK input and a signal from a voltage source 248. The voltage source 248 may be a circuit, such as a clock circuit, that can be configured to produce a signal of a determined frequency. The latch circuit 254 may be coupled to the logical AND circuit 252, and can include an output to supply a latch control signal to an input of the logical AND circuit 252. The logical AND circuit 252 may be coupled to a signal source 250. The signal source 250 can include an output to supply a clock signal to an input of the logical AND circuit 252. The signal source 250 may be a clock circuit, an oscillator circuit, a micro-processor circuit, digital to analog converter, or other circuit.

Like the first converter control circuit 208, the second converter control circuit 210 may include a comparison circuit, such as the comparison circuit 263, which can be coupled to the combiner circuit 220. The comparison circuit 263 may have input to receive voltage signals from one or more voltage sources. For example, the comparison circuit 263 may be coupled to a second hysteretic voltage source 260 and a second dc offset voltage source 262. The second dc offset voltage source 262 can produce a voltage referred to as a second programmable offset voltage. The second hysteretic voltage source 260 and the second dc offset voltage source 262 may each have an output to supply a voltage signal to an input of the comparison circuit 263. The first hysteretic voltage source 244 and the second hysteretic voltage source 260 may be programmable voltage sources, integrator circuits that produce a triangular output voltage by integrating a square wave, or other voltage sources. For example, the first hysteretic voltage source 244 can produce a first hysteretic voltage, which may be a 10 mV, 1.5 MHz triangle wave, and the second hysteretic voltage source 260 can produce second hysteretic voltage, which may be a 150 mV, 670 kHz triangle wave. A phase of the first hysteretic voltage with respect to the clock signal from the signal source 250 and of the second hysteretic voltage with respect to a clock signal from signal source 265 may be adjusted to compensate for a phase shift caused by the first filter circuit 222 and second filter circuit 224. When the first hysteretic voltage and the second hysteretic voltage are configured to compensate for the attenuation and phase shift caused by the first filter circuit 222 and the second filter circuit 224, the first hysteretic voltage may be perpendicular with $V(I_{SENSE\_FIRST})$, and the second hysteretic voltage may be perpendicular with $V(I_{SENSE\_SECOND})$. Waveforms may be said to be perpendicular when the waveforms cross at 90 degrees with respect to each other, similar to the intersection of the vertical and horizontal lines of a cross. The perpendicular crossings may enable the comparator circuit 242 and the comparator circuit 263 to change voltage levels on its outputs while minimizing electrical noise due to multiple switching cycles (e.g. chatter).

The second dc offset voltage source 262 and the first dc offset voltage source 246 may be voltage sources that provide a fixed amplitude voltage signal (e.g. buffers, resistor dividers, etc.), or voltage sources that can be configured to vary the voltage level (e.g. micro-controllers) of the voltage signal. The comparison circuit 263 may be coupled to an input of a logical AND circuit 268, and can include a non-inverted output to supply a second control signal, $V_{CONTROL\_SECOND}$, 261, to an input of the logical AND circuit 268. The comparison circuit 263 may include an inverted output to supply an inverted version of the second control signal, $V_{CONTROL\_SECOND}'$, 267, to an input of a latch circuit 264. The latch circuit 264 may be coupled to a voltage source 266. The voltage source 266 can have an output to supply a signal to an input of the latch circuit 264. The latch circuit 264 may be coupled to the logical AND circuit 268, and can include an output to supply a latch control signal to an input of the logical AND circuit 268. The logical AND circuit 268 may be coupled to a signal source 265. The signal source 265 can include an output to supply a signal to an input of the logical AND circuit 268. The signal source 265 may be a clock circuit, an oscillator circuit, a micro-processor circuit, digital to analog converter, or other circuit.

The combiner circuit 220 may be a circuit, such as a circuit including an operational amplifier and resistors, configured to produce a feedback voltage, $V_{FB}$ 299, based on signals received from the first current sense circuit 204 and the second current sense circuit 214. The combiner circuit 220 can combine the voltage generated when current from the first current sense circuit 204 flows through resistor 225 and the voltage generated when current from the second current sense circuit 214 flows through the resistor 227 to produce $V_{FB}$ 299. The combiner circuit 220 can supply $V_{FB}$ 299 to an input of the comparison circuit 242 and the comparison circuit 263.

The system 200 may further include a voltage source 237 coupled to a current source 241 and current source 247. The voltage source 237 may be a resistor divider, an output of a digital to analog controller, or other circuit, whose amplitude is high enough to drive the current source 241 and current source 247. The current source 241 and current source 247 may be transistor or operational amplifier based constant current sources, or other types of current sources. The current source 241 may be coupled to resistor 249 and a non-inverting input terminal of the comparison circuit 251. Current from the current source 241 may flow through the resistor 249 to produce a voltage signal representing a maximum amount of current that can be sourced by the first power source 202. When the current sourced by the first power source 202 is less than the maximum value (e.g. the voltage on the non-inverting input node of the comparison circuit 251 is greater than the voltage on the inverting node), the output of the comparison circuit 251 can reach a threshold level (e.g. logical high, logic level 1, etc.), indicating that the current flowing from the first power source 202 has not exceeded predetermined limit. When the voltage on the positive input node of the comparison circuit 251 is greater than the voltage on the negative input node, the output of the comparison circuit 251 may be below a threshold level (e.g. logical low, logic level 0, etc.), indicating that the current flowing from the first power source 202 to the first filter circuit 222 has exceeded the predetermined limit. The output of the comparison circuit 251 may be coupled to an input of the logical AND circuit 252.

The current source 247 may be coupled to resistor 257 and a non-inverting input terminal of the comparison 253. Current from the current source 247 may flow through the resistor 249 to produce a voltage signal representing a maximum amount of current that can be sourced by the second power source 212. When the voltage on the non-inverting input node of the comparison circuit 253 is greater than the voltage on the inverting node, the output of the comparison circuit 253 can exceed a threshold level. When the voltage on the positive input node of the comparison circuit 253 is greater than the voltage on the negative input node, the output of the comparison circuit 253 may be below a threshold level. The output of the comparison circuit 253 may be coupled to an input of the logical AND circuit 268.

In some embodiments, the first power source 202 may be the first power source 102, the first current sense circuit 204 may be the first current sense circuit 104, the second power source 212 may be the second power source 112, the second current sense circuit 214 may be the second current sense circuit 114, and the bi-directional converter circuit 218 may be the bi-directional converter circuit 118.

In some embodiments, the system 200 may include other circuits not shown. For example, the system may include resistors, capacitors, diodes, inductors, transistors, buffers, isolators, amplifiers, filters, transformers, logic circuits, digital circuits, mixed signal circuits, comparators, microprocessors, signal conditioning circuits, other circuits, or any combination thereof.

Further, the system 200 can be configured to operate in a single supply or dual supply configuration. When the system 200 is configured to operate with a single voltage supply, voltage source 232 can produce a reference voltage, $V_{REF}$, that provides a system ground, or zero node. In dual supply configurations, $V_{REF}$ 232 may be 0 V. In some single supply systems, $V_{REF}$ 232 may be 1.24 V (a common semiconductor band gap voltage) or other value.

During operation, the first converter control circuit 208 can determine when power may be transferred from the first power source 202 to the second load circuit 216 to compensate for a current demand of the second load circuit 216 when the second power source 212 cannot meet the current demand. The first converter control circuit 208 may determine that power can be transferred when $V_{FB}$ 299 is greater than the first hysteretic voltage offset by the first programmable offset voltage. Both the first hysteretic voltage and the second hysteretic voltage may be fixed frequency, fixed amplitude triangle waves, although in some cases, the hysteretic voltages may be square waves or other periodic waveforms. In some cases, a triangle wave may be used because an amplitude of $V_{FB}$ 299 may not always be known due to attenuation effects of the first filter circuit 222 and second filter circuit 224. When the first hysteretic voltage and the second hysteretic voltage are triangle waves, the system 200 can balance power regardless of the amplitude of $V_{FB}$. The frequency of the first hysteretic voltage and the second hysteretic voltage may be fixed to minimize the effects of electromagnetic interference (EMI) on other components in a system, such as the data storage device 501 shown in FIG. 5. Further, the frequency of the first hysteretic voltage and the second hysteretic voltage may be based on $L_1$ 290 and an acceptable amount of inductor ripple current. For example, when $L_1$ 290 2.2 microhenries, the first hysteretic voltage may be a 10 mV, 1.5 MHz triangle wave, and the second hysteretic voltage may be a 150 mV, 670 kHz triangle wave. The amplitude of the hysteretic voltages may be determined based on an anticipated amplitude variation of $V_{FB}$ 299. In some cases, system stability may be increased by increasing a value of the first hysteretic voltage, the second hysteretic voltage, or both. When the first converter control circuit 208 determines that power may be transferred from the first power source 202 to the second load circuit 216, the first converter control circuit 208 may provide a signal to the bi-directional converter circuit 218 to transfer the power.

In some examples, the first converter control circuit 208 can be configured to determine when power may be transferred from the first power source 202 to the second load circuit 216 in systems where the first power source 202 has a higher voltage than the second power source 212. This process may be referred to as a buck operation. In a buck operation, the first converter control circuit 208 may provide a signal, $V_{AND\_FIRST}$ 259, to the bi-directional converter circuit 218 to cause the bi-directional converter circuit 218 to provide power to the second load circuit 216 from the first power source 202. For example, the first power source 202 may supply an output signal with a voltage amplitude of 12 volts, and the second power source 212 may supply an output signal with a voltage amplitude of 5 volts. When the current demand of the load(s) coupled to the second power source 212 (e.g. the second load circuit 216) increases, the first converter control circuit 208 may provide a signal to the bi-directional converter circuit 218 to cause the bi-directional converter circuit 218 to provide current to the second load circuit 216 from the first power source 202.

The voltage corresponding to the current provided to the second load circuit 216 from the first power source 202 may be reduced by changing a duty ratio in which $S_1$ 280 opens and closes in a process using hysteretic control. In a buck operation, hysteretic control can enable the first converter control circuit 208 to cause $S_1$ 280 to open and $S_2$ 284 to close when current sourced by the first power source 202 is below a lower threshold, and to cause $S_1$ 280 to close and $S_2$ 284 to open when current supplied by the first power source 202 is above an upper threshold. The upper and lower thresholds may be based on where $V_{FB}$ 299 crosses the first hysteretic voltage (offset by the first programmable offset voltage), and may be determined by the comparison circuit 242. When $V_{FB}$ 299 is higher than the first hysteretic voltage offset by the first programmable offset voltage, the comparison circuit 242 can produce $V_{CONTROL\_FIRST}$ 243 with an amplitude above a threshold level (e.g. logic level 1), and $V_{CONTROL\_FIRST}'$ 245 with an amplitude below a threshold level (e.g. logic level 0). When $V_{FB}$ 299 is lower than the first hysteretic voltage offset by the first programmable offset voltage, the comparison circuit 242 can produce $V_{CONTROL\_FIRST}$ 243 at a logic level 0 and $V_{CONTROL\_FIRST}'$ 245 at a logic level 1.

The duty ratio of $S_1$ 280 may be based on a duty cycle of $V_{AND\_FIRST}$ 259. $V_{AND\_FIRST}$ 259 may be based on an output of the comparison circuit 251, the output of the latch circuit 254, the output of the signal source 250, the first hysteretic voltage offset by the first programmable offset voltage, and $V_{FB}$ 299. When $V_{FB}$ 299 is within the regulation of the first hysteretic voltage offset by the first programmable offset voltage, the duty cycle may be determined by the crossings of the first hysteretic voltage offset by the dc offset voltage and $V_{FB}$ 299. Under steady state conditions (e.g. power is balanced), the duty cycle may be based on a ratio of a voltage supplied by the first power source 202 voltage and a voltage supplied by the second power source 212. For example, when the first power source 202 voltage is 12 V and the second power source 212 voltage is 5 V, the steady state duty cycle may be 5/12, or 41.7%. However, when the power is not balanced, the duty cycle may be increased until the power is balanced. This is because a higher duty cycle may cause the current flowing through $L_1$ 290 ($I(L_1$ 290)) to build faster, which can speed up power balancing response times. Power balancing can allow two or more power sources to share a responsibility of providing power to a load(s). Power balancing can allow power to be available during periods of high current demand. In some cases, such as during startup or due to fast transient events, $V_{FB}$ 299 may be higher than the maximum value of the first hysteretic voltage offset by the dc offset voltage, which could cause the duty cycle of $V_{AND\_FIRST}$ 259 to reach 100%. When the duty cycle of $V_{AND\_FIRST}$ 259 reaches 100%, the frequency of $I(L_1$ 290) may be different than the duty frequency of the first hysteretic voltage. However, when $V_{FB}$ 299 is within the maximum and minimum values of the first hysteretic voltage offset by the first programmable offset voltage, $I(L_1$ 290) can have a frequency equal to that of the first hysteretic voltage. For example, if the frequency of the first hysteretic voltage is 1.5 MHz, the frequency of $I(L_1$ 290) can also be 1.5 MHz.

When the frequency of $I(L_1$ 290) changes, some systems may experience an increase in EMI. To ensure that $I(L_1$ 290) maintains the fixed frequency of the first hysteretic voltage, the latch circuit 254, signal source 250, and voltage source 248 may be used to create a signal with a frequency equal to the frequency of the first hysteretic voltage. The latch circuit 254 can receive $V_{CONTROL\_FIRST}'$ 245 from the comparison circuit 242 and a reset signal from the voltage source 248. The reset signal may have the same frequency as the first hysteretic voltage and can include a single pulse (e.g. 20 ns per cycle). When $V_{CONTROL\_FIRST}'$ 245 is a logic level 0 and the latch circuit 254 detects the pulse in the reset signal, the latch circuit 254 may provide a logic level 1 to the logical AND circuit 252.

The signal provided to the logical AND circuit 252 by the signal source 250 may have the same frequency as the hysteretic voltage. The duty cycle of the signal from the signal source 250 (clock signal) may be selected to be the maximum duty cycle of $V_{AND\_FIRST}$ 259, and thus the maximum duty cycle of $I(L_1$ 290) in buck operation. For example, when the clock signal has an 80% duty cycle, the maximum duty cycle of $V_{AND\_FIRST}$ 259 may be 80%. The duty cycle of the clock signal may be determined by how quickly the first converter control circuit 208 needs to respond to transients due to power balancing, startup, and other transients, as well as system stability considerations.

The logical AND circuit 252 can provide $V_{AND\_FIRST}$ 259 to the switch driver circuit 291 to cause $S_1$ 280 to open or close based on the amplitude of $V_{AND\_FIRST}$ 259. For example, when $V_{AND\_FIRST}$ 259 is a logical high, $S_1$ 280 may close, thus creating a low impedance current path. Current from the first power source 202 can flow through $S_1$ 280 to build up current in $L_1$ 290. When $V_{AND\_FIRST}$ 259 is a logical low, $S_1$ 280 may open, creating a high impedance current path, and preventing further current buildup in $L_1$ 290. However, when $S_1$ 280 is open, current may flow from $L_1$ 290 to a common return path via diode 221, which may be a schottky diode, PN diode, body diode of a sense FET, or other device, or other diode.

In some systems, synchronous rectification may be used to reduce power losses caused when current flows through the diode 221. When the current through the diode 221 reaches a threshold level, $S_2$ 284 may close to provide a low impedance current path from $L_1$ 290 to the common return path. The value of the current may be detected by the current sensing circuit 288. The current sensing circuit 288 can produce a sense current proportional to the current flowing through the diode 221 and $S_2$ 284 that can cause a voltage to form across the resistor 231. The voltage may be received by a non-inverting input of a comparison circuit 271. If the voltage at the non-inverting input of the comparison circuit 271 is greater than a signal received at the inverting input from signal source 273, the comparison circuit 271 can provide an output voltage above a threshold level to an input of a logical AND circuit 275. If the output voltage is above a threshold level and $V_{AND\_FIRST}$ 259 is at a logical low, the logical AND circuit 275 can provide a logical high to an input of the logical OR circuit 240, which can cause $S_2$ 284 to close. In some embodiments, the signal produced by the signal source 273 may be based on a minimum allowable current flow. For example, signal source 273 may be set to 20 mV direct current (dc) voltage to ensure that $S_2$ 284 is closed when current greater than or equal to 20 mA is detected. Synchronous rectification may be turned off when the current through $L_1$ 290 approaches zero to prevent current reversal that could pull power from a power rail that the bi-directional converter circuit 218 just provided power to. The switch driver circuit 291 and the switch driver circuit 296 can prevent cross conduction between $S_2$ 284 and $S_1$ 280.

The second converter control circuit 210 can be configured to determine when power may be transferred from the second power source 216 to the first load circuit 206 in systems where the first power source 202 has a lower voltage than the second power source 212. This process may be referred to as a boost operation. In a boost operation, the second converter control circuit 210 may provide a signal, $V_{AND\_SECOND}$ 272, to the bi-directional converter circuit 218 to cause the bi-directional converter circuit 218 to provide current to the first load circuit 206 from the second power source 212.

An amount of current provided to the first load circuit 206 from the second power source 212 may be based on a duty ratio in which $S_2$ 284 opens and closes in a process using hysteretic control. In a boost operation, hysteretic control can enable the second converter control circuit 210 to cause $S_1$ 280 to open and $S_2$ 284 to close when $V_{FB}$ 299 is less than the second hysteretic voltage offset by the second offset voltage, and cause $S_1$ 280 to close and $S_2$ 284 to open when $V_{FB}$ 299 is greater than the second hysteretic voltage offset by the second offset voltage. The comparison circuit 263 can determine if $V_{FB}$ 299 is greater than or less than the second hysteretic voltage offset by the second offset voltage. When $V_{FB}$ 299 is less than the second hysteretic voltage offset by the second offset voltage, the comparison circuit 263 can produce $V_{CONTROL\_SECOND}$ 261 with an amplitude less than a threshold level (e.g. logic level 0), and $V_{CONTROL\_SECOND}'$ 267 with an amplitude above a threshold level (e.g. logic level 1). When $V_{FB}$ 299 is greater than the second hysteretic voltage offset by the second programmable dc offset, the comparison circuit 263 can produce $V_{CONTROL\_SECOND}$ 261 at a logic level 1 and $V_{CONTROL\_SECOND}'$ 267 at a logic level 0.

The duty ratio of $S_2$ 284 may be based on a duty cycle of $V_{AND\_SECOND}$ 272, which may be based on amount of current flowing through $L_1$ 290. For example, the duty cycle may be $\frac{1}{2}LI^2$, where L is $L_1$ 290, and I is $I(L_1$ 290). The duty cycle of $V_{AND\_SECOND}$ 272 may be limited to prevent system instabilities. The system may become unstable when the boost operation causes a zero to form in a right-half plane of a control loop, such as when the second converter circuit 210 operates in a continuous mode as opposed to the more stable discontinuous mode. However, there may be times where operating in discontinuous mode may not provide enough transient response (e.g. build current fast enough) to meet system requirements, and the second converter circuit 210 may be configured to operate in continuous mode. A maximum duty cycle of $V_{AND\_SECOND}$ 272 may be selected based on system design, component selection, and other considerations to ensure system power balancing and stability requirements are met.

In some instances, the maximum duty cycle of $V_{AND\_SECOND}$ 272 may be determined by the latch circuit 264, voltage source 266, signal source 265, and $V_{CONTROL\_SECOND}'$ 267. The latch circuit 264 can receive $V_{CONTROL\_SECOND}'$ 267 from the comparison circuit 263 and a reset signal from the voltage source 266. The reset signal may have the same frequency as the second hysteretic voltage and can include a single pulse (e.g. 20 ns per cycle). When $V_{CONTROL\_SECOND}'$ 267 is a logic level 1, latch circuit 264 can provide a logic level 1 to the logical AND circuit 268 when the latch circuit 264 detects the pulse in the reset signal. The signal provided to the logical AND circuit 268 by the signal source 265 may have the same frequency as the hysteretic voltage. The duty cycle of the signal from the signal source 265 (clock signal) may be selected to be the maximum duty cycle of $V_{AND\_SECOND}$ 272. In some embodiments, the latch circuit 264, voltage source 266, and signal source 265 may be omitted.

The logical AND circuit 268 can provide $V_{AND\_SECOND}$ 272 to the switch driver circuit 296 to cause $S_2$ 284 to open or close based on the amplitude of $V_{AND\_SECOND}$ 272. For example, when $V_{AND\_SECOND}$ 272 is a logical high, $S_2$ 284 may close, which can cause a buildup of current in $L_1$ 290. When $V_{AND\_SECOND}$ 272 is a logical low, $S_2$ 284 may open, which may create a high impedance current path, cause the current stored in $L_1$ 290 to be discharged to the first load circuit 206 via the diode 211, and prevent further current buildup in $L_1$ 290. Losses due to the diode 211 may be reduce through synchronous rectification, which can cause $S_1$ 280 to close when a current detected by the current sensing circuit 282 exceeds a threshold amount. The current sensing circuit 288 can produce a sense current proportional to the current flowing through the diode 211 and $S_1$ 280 that may cause a voltage to form across the resistor 229. The voltage may be received by a non-inverting input of a comparison circuit 277. If the voltage at the non-inverting input of the comparison circuit 277 is greater than a signal received at the inverting input from signal source 279, the comparison circuit 277 can provide an output voltage above a threshold level to an input of a logical AND circuit 281. If the output voltage is above a threshold level and $V_{AND\_SECOND}$ 272 is at a logical low, the logical AND circuit 281 can provide a logical high to an input of the logical OR circuit 238, which can cause $S_1$ 280 to close.

Figure 3:
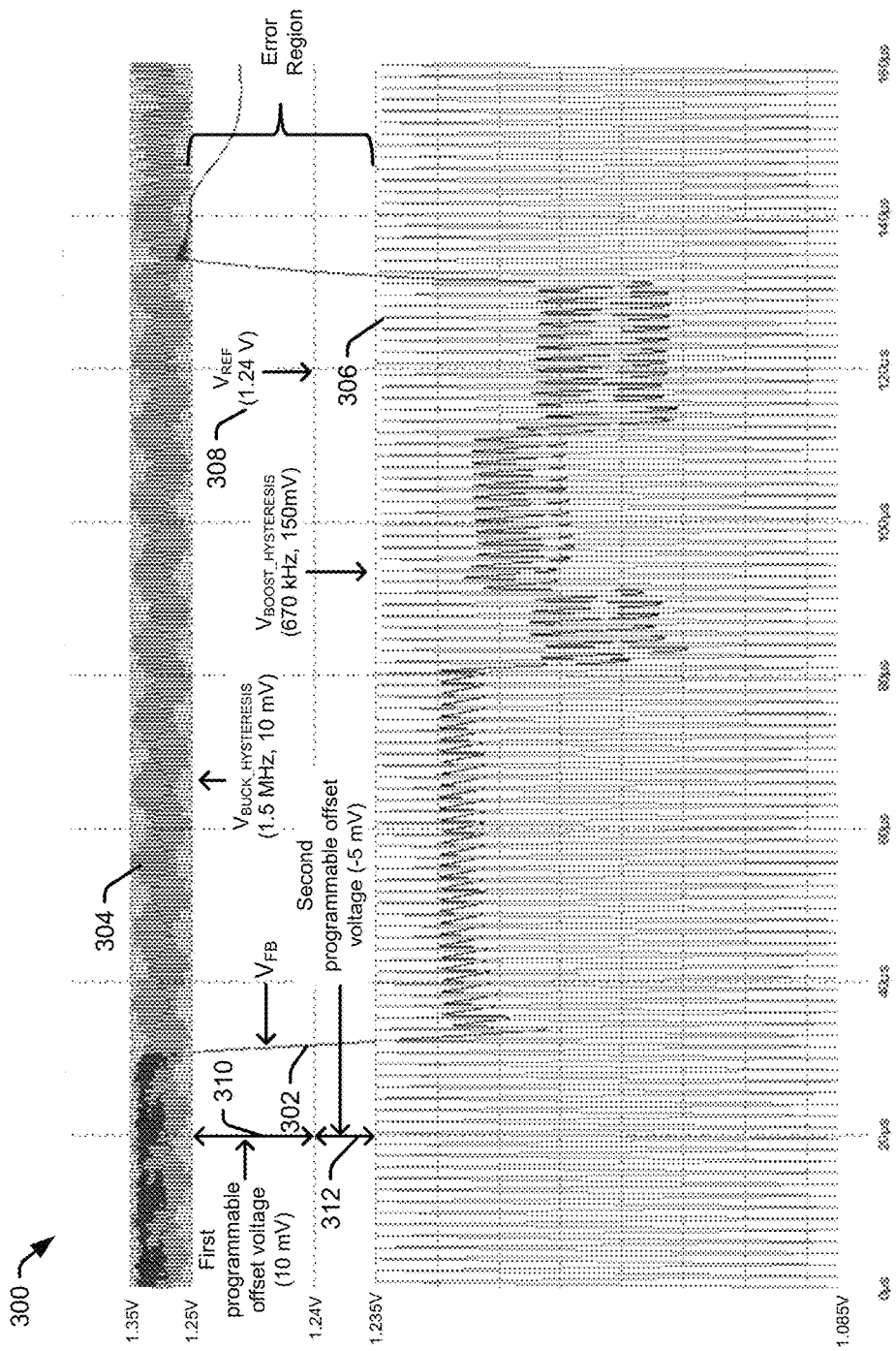
FIG. 3 is an illustration of waveforms of power balancing, in accordance with certain embodiments of the present disclosure.

Referring to FIG. 3, an illustration of waveforms of power balancing is shown and generally designated 300. The waveforms 300 may be voltage waveforms of the systems 100 and 200, according to certain embodiments. The waveforms 300 may depict a buck operation hysteretic voltage waveform 304, a boost operation hysteretic voltage waveform, 306, and a feedback voltage, $V_{FB}$, 302. In some embodiments, $V_{FB}$ 302 may the $V_{FB}$ 299, the buck operation hysteretic waveform 304 may be the first hysteretic voltage produced by the first hysteretic voltage source 244, and the boost operation hysteretic waveform 306 may be the second hysteretic voltage produced by the second hysteretic voltage source 260. The waveforms 300 may further depict reference a voltage $V_{REF}$ 308, first programmable offset voltage 310, and second programmable offset voltage 312. In some examples, $V_{REF}$ 308 may be $V_{REF}$ 232, the first programmable offset voltage 310 may be the first programmable offset voltage produced by the first dc offset voltage source 246, and the second programmable offset voltage 312 may be the second programmable offset voltage produced by the second dc offset voltage source 262.

When power is transferred from a high voltage power supply (such as the first power source 102 shown in FIG. 1 or the first power source 202 shown in FIG. 2) to a load (such as the second load circuit 116 shown in FIG. 1 or the second load circuit 216 shown in FIG. 2) coupled to a low voltage power supply (such as the second power source 112 shown in FIG. 1 or the second power source 212 shown in FIG. 2), $V_{FB}$ 302 may increase proportionally to the amount of power being transferred. When $V_{FB}$ 302 increases to a threshold level, the transfer of power may be regulated via a buck operation. For example, when $V_{FB}$ 302 is between 1.25 V and 1.35 V, the power transfer may be regulated by the buck operation, thus allowing the system to balance a power outputted by the high voltage power supply with a power outputted by the low voltage power supply.

When power is transferred from the low voltage power supply to a load (such as the first load circuit 106 shown in FIG. 1 or the first load circuit 206 shown in FIG. 2) coupled to the high voltage power supply, $V_{FB}$ 302 may decrease. When $V_{FB}$ 302 decreases below a threshold level (e.g. the second programmable offset voltage 312), the power may be transferred via a boost operation. For example, when $V_{FB}$ 302 is between 1.235 V and 1.085 V, the power transfer may be regulated via the boost operation, which can allow the system to balance the power outputted by the high and low voltage power supplies. An amount of power transferred may be based on a difference between $V_{FB}$ 302 and $V_{REF}$ 308. For example, more power may be transferred at t=85 µs than at t=50 µs since the difference between $V_{FB}$ 302 and $V_{REF}$ 308 is larger at t=85 µs than at t=50 µs.

The amplitude of the boost hysteretic waveform 306 may be higher than the buck hysteretic waveform 304 because $V_{FB}$ 302 may have a higher magnitude and be subject to greater variation in boost mode than in buck mode. This may be a result of the difference in current demands of a load coupled to a low voltage power supply as opposed to a high voltage power supply. For example, a load consuming 3 W of power from a 5 V power supply can draw 600 mA of current, while a load consuming 3 W of power from a 12 V power supply can draw just 250 mA of current. In some cases, it may be desirable to use a boost (or buck) operation hysteretic waveform with an amplitude large enough for regulation while keeping the amplitude small enough to reduce unwanted electrical effects, such as EMI.

The voltage offsets of the boost operation hysteretic waveform 306 and the buck operation hysteretic waveform 304 may be set by the selection of the values of the first programmable offset voltage 310 and the second programmable offset voltage 312. The difference between the first programmable offset voltage 310 and the second programmable offset voltage 312 may set an error region of the system. The error is necessary for the system to determine when to perform boosting operations of bucking operations. The amount of error may be determined by amplifier offset or power balancing requirements. For higher efficiency, a power balancing system (such as the system of power balancing 100 shown in FIG. or the system of power balancing 200 shown in FIG. 2) may minimize switching of the buck operation hysteretic voltage waveform 304, switching of the boost operation hysteretic waveform 306, or both. A higher error may result in power balancing only when a sufficient difference power threshold (e.g. greater than 1 W) has been reached between the high voltage power source and the low voltage power source. In some examples, power may be unregulated when $V_{FB}$ 302 is in the error region, and the system may be considered to power balanced.

The amplitude of the first programmable offset voltage 310 and the second programmable offset voltage 312 may change when boosting or bucking operations begin. For example, the system may perform boosting operations when power sourced by the high voltage power source is 1 W greater than an ideal power balance (e.g. power supplies are supplying the same amount of power), and perform buck operations when power sourced by the low voltage power source is 2 W greater than the ideal power balance. In some cases, the first programmable offset 310 and the second programmable offset 312 may be changed on the fly, such as by changing an output voltage on a digital to analog converter.

Figure 4:
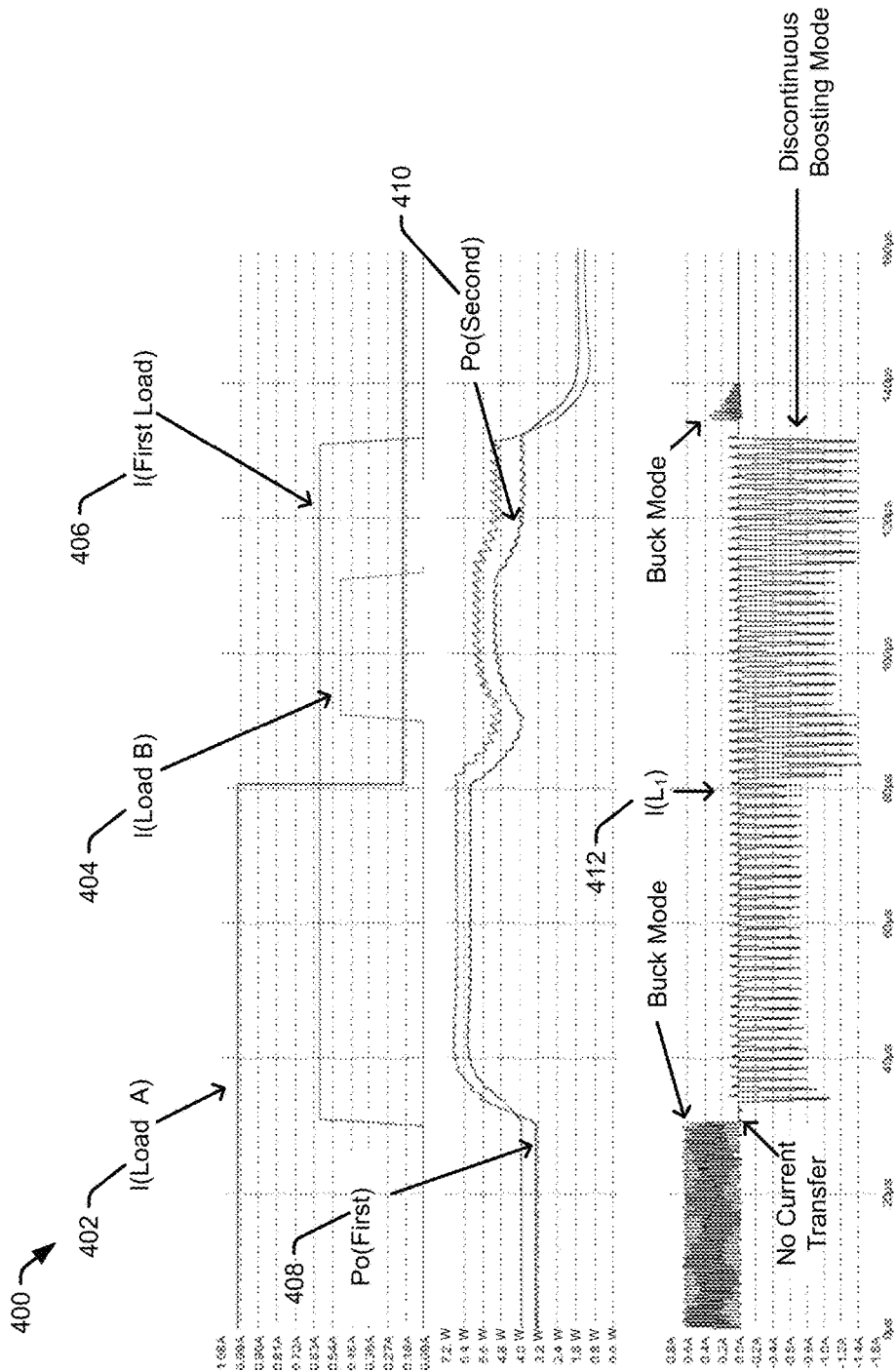
FIG. 4 is an illustration of waveforms of power balancing, in accordance with certain embodiments of the present disclosure.

Referring to FIG. 4, an illustration of waveforms of power balancing is shown and generally designated 400. The waveforms 400 may be current waveforms of the systems 100 and 200, according to certain embodiments. The waveforms 400 may depict how power supply output power and inductor current are affected by changes in current demands of attached loads. In some embodiments, I(Load A) 402 can represent a current consumption of load A 219, I(Load B) 404 can represent a current consumption of load B 217, and I(First Load) 406 can represent a current consumption of the first load circuit 206. Po(First) 408 may be an amount of power supplied by a first power source and Po(Second) 410 may be an amount of power supplied by a second power source. For illustrative purposes, the first power source may be the first power source 202 configured to supply 12 volts, and the second power source may be the second power source 212 configured to supply 5 volts. Further I($L_1$) 412 may represent a current flowing through $L_1$ 290.

From t=0 to 30 µs, a current demand of I(Load A) 402 may be 1 amp, which can correspond to a power demand of 5 watts (5 volts*1 amp). The current demand of I(Load B) 404 and I(First Load) 406 may each be 90 mA, which can correspond to a power demand of 450 milliwatts ("mW") and 1.08 watts, respectively. To compensate for the power demands corresponding to I(Load A) 402 and I(Load B) 404, a buck operation can transfer current to load A 219 and load B 217 from the first power source 202 to balance Po(First) 408 and Po(Second) 410. An 800 mW offset between Po(First) 408 and Po(Second) 410 may be due to programmable dc offset voltages corresponding to a hysteretic buck voltage and a hysteretic boost voltage.

At approximately t=28 µs, I(First Load) 406 may begin to increase, thus causing an increase in Po(First) 408 and Po(Second) 410. Po(Second) 410 may increase to balance the power, even though there was no change in I(Load A) 402 and I(Load B) 404. When Po(First) 408 and Po(Second)

410 are close in value (e.g. within the error region), there may be no boosting or bucking operations, and no power may be transferred. For example, from t=29 μs to 32 μs, there may be no transfer of current.

From t=32 μs to 81 μs, I(First Load) 406 may be approximately 600 mA, which may correspond to a power demand of 7.2 watts. Since 7.2 watts of power demand is more than a cumulative power demand corresponding to I(Load A) 402 (5 watts) and I(Load B) 404 (450 mW), a boosting operation can transfer current from the second power source 212 to the first load circuit 206. A power offset between Po(First) 408 and Po(Second) 410 may be different from t=32 μs to 81 μs as compared to t=0 μs to 30 μs, because of the settings of the programmable dc offset voltages, as the programmable dc offset voltages can cause the system to commence boosting or bucking operations at different loading conditions.

In some embodiments, the boosting operation may be via a discontinuous boost mode. In a discontinuous boost mode, the energy stored in the inductor $L_1$ 290 may be completely discharged before $L_1$ 290 can be provided with more energy. Boosting operations using a discontinuous boost mode may produce higher peak current than boosting operations using a continuous mode. However, boosting operations using a discontinuous mode may be more stable and have a faster response time to changing load conditions than boosting operations using a continuous operation mode. A decision to use a discontinuous operation mode, a continuous operation mode, or a combination of the two, may be based on system requirements, such as stability and transient response requirements.

From t=81 μs to 90 μs, I(Load A) 402 may reduce from 1 amp to 200 mA, which can enable the second power source 212 to supply more current to the first load circuit 206 to compensate for I(First Load) 406. A magnitude of $I(L_1)$ 412 can increase from 900 mA to 1.5 amps, which may indicate an increase in the amount of current provided from second power source 212 to the first load circuit 206.

From t=90 μs to 112 μs, I(Load B) 404 may increase from 100 mA to 500 mA, thus increasing the combined power consumption of I(Load A) 402 and I(Load B) 404 to 3.5 watts (700 mA*5 volts). However, the power consumption of I(First Load) 406 may still be 7.2 watts. Current can be provided from second power source 212 to the first load circuit 206 to balance a power demand on the first power source 202 and second power source 212. Further, less boost current may be flowing through $I(L_1)$ 612, which can indicate a decrease in the amount of current provided from second power source 212 to the first load 206.

At t=112 μs, I(Load B) 404 may reduce from 500 mA to 100 mA, which can allow a larger portion of the current provided by second power source 212 to be available to compensate for I(First Load) 406. A magnitude of $I(L_1)$ 612 can increase from 900 mA to 1.5 amps, which can indicate an increase in the amount of current provided from second power source 212 to the first load circuit 206.

From t=131 μs to 133 μs, I(First Load) 406 may be transitioning from current demand of 600 mA to a current demand of 100 mA. From t=133 μs to 135 μs, there may be no current provided to the first load circuit 206 from the second power source 212, and no current provided from the first power source 202 to load A 219 and load B 217. However, from 135 μs to from 140 μs, a portion the current from the first power source 202 may be provided to load A 219 and load B 217. This may occur when energy stored in capacitors or inductors discharge their energy, creating temporary demands for current.

For illustrative purposes, $I(L_1)$ 412 may be said to have a negative value during boost operations, and a positive value during buck operations. In some embodiments, $I(L_1)$ 612 may have a positive value during boost operations and a negative value during buck operations.

Figure 5:
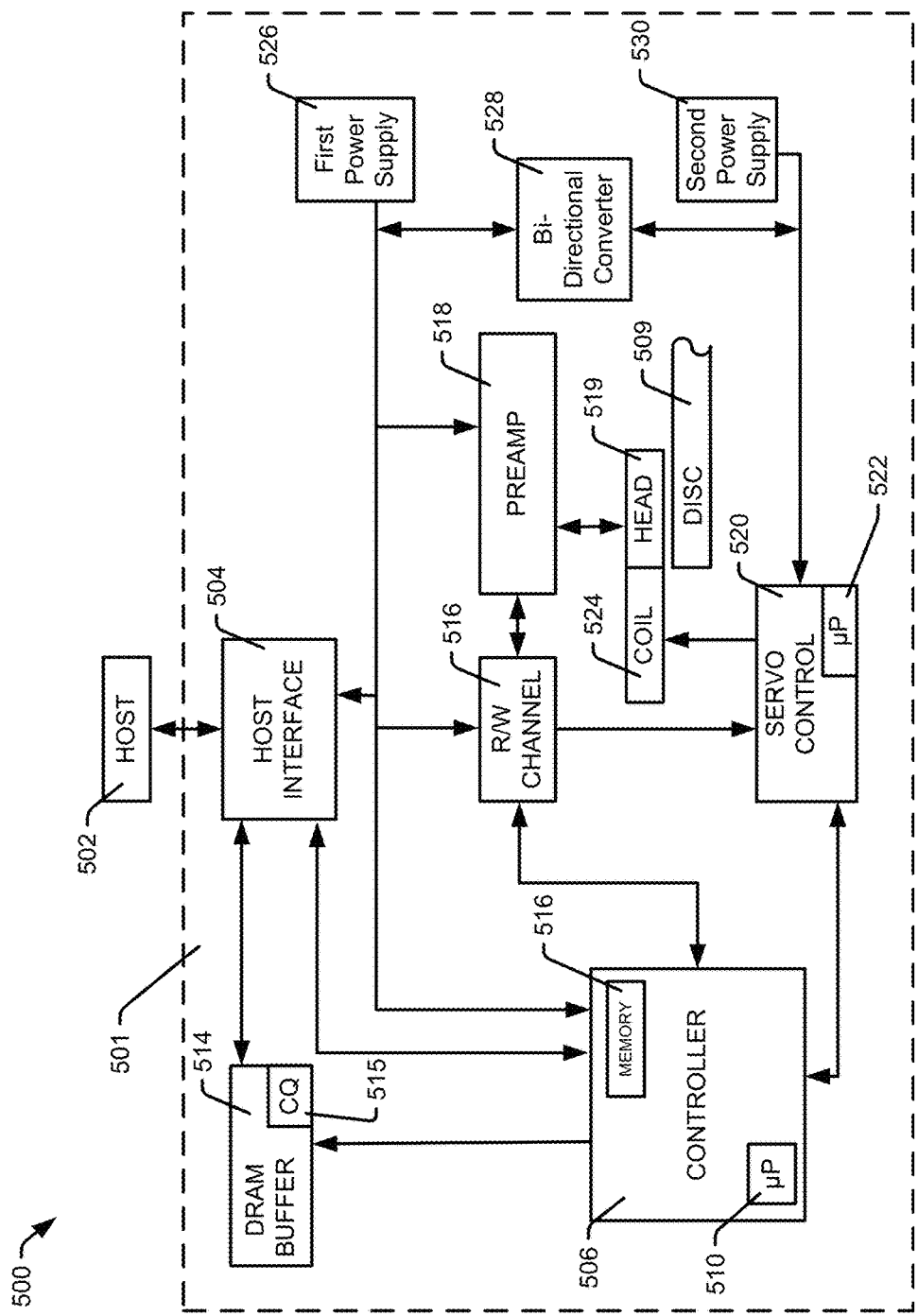
FIG. 5 is a diagram of a system of power balancing, in accordance with certain embodiments of the present disclosure.

In some examples, the current waveforms may correspond to components in a data storage device (such as the data storage device 501 shown in FIG. 5). For example, I(Load A) 402 may correspond to a read-write channel (such as the read-write channel 516 shown in FIG. 5), I(Load B) 404 may correspond to a data controller (such as the data controller 506 shown in FIG. 5), and I(First Load) 406 may correspond to a spindle or voice coil motor (such as the servo control 520 shown in FIG. 5).

Referring to FIG. 5, a diagram of a system of power balancing is shown and generally designated 500. The system 500 may be an example of the systems 100 and 200. The system 500 can include a data storage device ("DSD") 501 that can optionally connect to be removable from a host device 502, which can be a device or system having stored data, such as a desktop computer, a laptop computer, a server, a digital video recorder, a photocopier, a telephone, a music player, other electronic devices or systems not listed, or any combination thereof. The data storage device 501 can communicate with the host device 502 via the hardware/firmware based host interface circuit 504 that may include a connector (not shown) that allows the DSD 501 to be physically removed from the host 502.

The DSD 501 can include a programmable controller 506 with associated memory 516, and processor 510. The programmable controller 506 may be part of a system on chip (SOC). A buffer 514, which can be volatile or non-volatile memory (e.g. dynamic random access memory, flash memory, etc.), may temporarily store user data during read and write operations and can include a command queue (CQ) 515. The CQ 515 may be volatile or non-volatile memory, and can temporarily store multiple access operations pending execution. The read-write (R/W) channel 516 can encode data during write operations and reconstruct user data during read operations. The preamplifier/driver circuit (preamp) 518 can apply write currents to the head(s) 519 and can provide pre-amplification of read back signals. A servo control circuit 520 may use servo data from a servo sector to provide the appropriate current to the voice coil motor 524 to position the head(s) 519 over disc(s) 509. The controller 506 can communicate with a processor 522 to move the head(s) 519 to the desired locations (e.g. tracks) on the disc(s) 509 during execution of various pending commands in the command queue 515 or during other operations. The channel configurations and systems described herein may be implemented in the R/W channel 516 as hardware circuits, software, memory, or any combination thereof.

Further, the DSD 501 can include a first power supply 526 which can provide power to the host interface 504, controller 506, R/W channel 516, pre-amp 518, or other circuits or systems not shown. A second power supply 530 can provide power to the servo control 520 or other circuits not shown. When a power demand on the first power supply 526 exceeds a threshold level, the bi-directional converter circuit 528 can provide power from the second power supply 530 to the host interface 504, controller 506, R/W channel 516, pre-amp 518, or other circuits to compensate for a current demand on the first power supply 526. When a power demand on the second power supply 530 exceeds a threshold level, the bi-directional converter circuit 528 can provide current from the first power supply 526 to the servo control 520 or other circuits. In some embodiments, the first power supply 526 may be a 5 volt power supply. The second power supply 530 may be a 12 volt power supply.

A low voltage threshold as used herein can be a voltage level sufficiently low enough to cause a receiving circuit to perform tasks associated with having a low voltage at an input. For example, a voltage below a threshold level may be recognized as a logical zero by logical AND circuits.

A high voltage threshold as used herein can be a voltage level sufficiently high enough to cause a receiving circuit to perform tasks associated with having a high voltage at an input. For example, a voltage above a threshold level may be recognized as a logical one by logical AND circuits, or cause a relay or transistor to create a low impedance current path.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a first current sense circuit configured to produce a first sense signal based on current received from a first power source;
a second current sense circuit configured to produce a second sense signal based on current received from a second power source;
a combiner circuit configured to:
receive the first sense signal and the second sense signal;
produce a feedback signal based on a combination of the first sense signal and the second sense signal; and
a bi-directional converter circuit configured to provide an amount of current, based on the feedback signal, from the second power source to a first load coupled to the first power source to compensate for a current demand of the first load that cannot be met by the first power source.

2. The apparatus of claim 1 further comprising:
the bi-directional converter circuit configured to provide the amount of current, based on the feedback signal, from the first power source to a second load coupled to the second power source to compensate for a current demand of the second load that cannot be met by the second power source.

3. The apparatus of claim 2 further comprising:
the bi-directional converter circuit configured to provide the amount of current, based on the feedback signal, from the first power source to the second load when the first load is drawing current from the first power source and the second load is drawing current from the second power source, in order to compensate for a current demand of the second load that cannot be met by the second power source.

4. The apparatus of claim 2 further comprising:
a first converter circuit configured to produce a first control voltage to cause the bi-directional converter circuit to divert current from the first power source to the second load based on the feedback signal to compensate for a current demand of the second load that cannot be met by the second power source; and
a second converter circuit configured to produce a second control voltage to cause the bi-directional converter circuit to divert current from the second power source to the first load based on the feedback signal to compensate for a current demand of the first load that cannot be supplied by the first power source.

5. The apparatus of claim 4 further comprising:
the first converter control circuit configured to:
receive the feedback signal and a reference voltage representing a regulation threshold corresponding to a regulation of current from the first power source;
compare the feedback signal to the reference voltage;
produce the first control voltage with an amplitude greater than an upper threshold level when the feedback signal has a higher amplitude than the reference voltage;
produce the first control voltage with an amplitude less than a lower threshold level when the feedback signal has a lower amplitude than the reference voltage; and
provide the first control voltage to the bi-directional converter circuit to divert current from the first power source to the second load to keep the regulation of the current to less than the regulation threshold.

6. The apparatus of claim 4 further comprising:
the second converter control circuit configured to:
receive the feedback signal and a reference voltage representing a regulation threshold corresponding to a regulation of current from the second power source;
compare the feedback signal to the reference voltage;
produce the second control voltage with an amplitude greater than an upper threshold level when the feedback signal has a lower amplitude than the reference voltage;
produce the second control voltage with an amplitude less than a lower threshold level when the feedback signal has a higher amplitude than the reference voltage; and
provide the second control voltage to the bi-directional converter circuit to divert current from the second power source to the first load to keep the regulation of the current to less than the regulation threshold.

7. A system comprising:
a first control circuit configured to provide a first control signal to a first input of a bi-directional converter circuit based on current supplied by a first power source coupled to a first input/output ("I/O") node of the bi-directional converter circuit;

a second control circuit configured to provide a second control signal to a second input of the bi-directional converter circuit based on current supplied by a second power source coupled to a second I/O node of the bi-directional converter circuit; and the bi-directional converter circuit configured to transfer an amount of current from the second power source to a first load coupled to the first I/O node based on a first feedback signal representing an amount of power provided from the second power source to the first load to compensate for a current demand of the first load that cannot be supplied by the first power source.

8. The system of claim 7 further comprising:
a low pass filter circuit including an input coupled to the output of the first power source and an output coupled to the first I/O node of the bi-directional converter circuit, the low pass filter circuit configured to low pass filter an output signal from the first power source to reduce an amount of noise in the first feedback signal.

9. The system of claim 7 further comprising:
the bi-directional converter circuit includes:
 a sensing circuit including a first I/O node coupled to the output of the second power source and a second I/O node coupled to the input of the first load, the sensing circuit configured to determine a current flowing between the first I/O node and the second I/O node and provide an output signal based on the current; and
 a detection circuit coupled to the sensing circuit and configured to receive the output signal and determine if the current is less than a threshold based on the output signal.

10. The system of claim 9 further comprising:
the detection circuit includes:
 an input to receive a reference voltage based on the threshold; and
 a comparison circuit configured to compare the reference voltage and the output signal to determine if the current is less than the threshold, and supply a signal to the first input of the bi-directional converter circuit to cause the bi-directional converter circuit to transfer current from the second power supply to the first load to compensate for a current demand of the first load that cannot be met by the first power source when the current is less than the threshold.

11. The system of claim 7 further comprising:
the bi-directional converter circuit includes the second I/O node coupled to an input of a second load and configured to transfer an amount of current from the first power source to the second load based on a second feedback signal representing an amount of current to be provided to the second load from the first power source to compensate for a current demand of the second load that cannot be met by the second power source.

12. The system of claim 11 further comprising:
the bi-directional converter circuit configured to transfer an amount of current from the first power source to the second load based on a current demand of the first load.

13. The system of claim 11 further comprising:
a combiner circuit configured to:
 combine the first feedback signal and the second feedback signal to produce a third feedback signal;
 provide the third feedback signal to the first control circuit to determine when to transfer current from the first power source to the second load to compensate for a current demand of the second load that cannot be supplied by the second power source; and
 provide the third feedback signal to the second control circuit to determine when to transfer current from the second power source to the first load to compensate for a current demand first load of the second load that cannot be supplied by the first power source.

14. The system of claim 13 further comprising:
the bi-directional converter circuit includes:
 an inductor coupled to an I/O node and the input of the second load;
 a first switch circuit coupled to the input of the first load and the I/O node and configured to provide a first current from the first power source to the second load through the inductor to reduce a voltage corresponding to the first current from a voltage of the first power source to a voltage of the second power source based on the third feedback signal; and
 a second switch circuit coupled to a common return path and the I/O node and configured to provide a second current from the second power source to the first load through the inductor based on the third feedback signal.

15. The system of claim 13 further comprising:
the first converter control circuit includes:
 a first input to receive a reference voltage;
 a second input to receive the third feedback signal;
 a comparator circuit configured to:
  compare the reference voltage with the third feedback signal to produce a first control signal above a high threshold level at a first output when the third feedback signal is higher than the reference voltage;
  produce a second control signal at a second output, and the second control signal is an inverse of the first control signal;
 a logical circuit configured to:
  receive the second control signal and a reset signal having a same frequency as the reference voltage and including a single pulse of a pre-determined length;
  produce a first logical output signal based on the reset signal and the second control signal;
  perform a logical AND operation on the first control signal, the first logical output signal, and a clock signal having the same frequency as the reference voltage, to synchronize the reference voltage with the first control signal; and
  produce a logical output signal based on the AND operation to cause the bi-directional converter circuit to transfer current from the first power source to the second load at the same frequency as the reference voltage and at a duty cycle less than or equal to a duty cycle of the clock signal.

16. The system of claim 15 further comprising:
the bi-directional converter circuit includes:
 a delay circuit configured to receive the logical output signal and produce a time delayed signal based on the logical output signal;
 a comparator circuit having a first input to receive the time delayed signal and a second input to receive a reference voltage, and configured to compare the time delayed signal with the reference voltage to produce an indicator signal; and
 a switch driver circuit configured to create one of a low impedance current path between the first power source and the second load and a high impedance path between the first power source and the second load based on the indicator signal.

17. A system comprising:
a first current sense circuit configured to produce a first sense signal based on current received from a first power source;
a second current sense circuit configured to produce a second sense signal based on current received from a second power source;
a voltage source configured to produce a hysteretic voltage representing a regulation threshold corresponding to a regulation of current from the second power source; and
a bi-directional converter circuit configured to provide an amount of current based on the first sense signal, the second sense signal, and the hysteretic voltage, from the second power source to a first load coupled to the first power source to compensate for a current demand of the first load that cannot be met by the first power source.

18. The system of claim 17 further comprising:
a voltage source configured to produce a second hysteretic voltage representing a regulation threshold corresponding to a regulation of current from the first power source; and
the bi-directional converter circuit configured to provide an amount of current based on first sense signal, the second sense signal, and the second hysteretic voltage from the first power source to a second load coupled to the second power source to compensate for a current demand of the second load that cannot be met by the second power source.

19. The system of claim 17 further comprising:
the hysteretic voltage includes a periodic waveform and an offset voltage; and
the regulation threshold is the periodic waveform offset by the offset voltage.

20. The system of claim 19 further comprising:
a combiner circuit configured to:
receive the first sense signal and the second sense signal;
produce a feedback signal based on the first sense signal and the second sense signal; and
the bidirectional converter circuit configured to provide an amount of current from the second power source to a first load coupled to the first power source to compensate for a current demand of the first load that cannot be met by the first power source when the feedback signal is within the regulation threshold.

* * * * *